United States Patent [19]

Coppi et al.

[11] Patent Number: 4,851,180

[45] Date of Patent: Jul. 25, 1989

[54] MAGNETIC COIL ARRANGEMENT FOR FUSION REACTORS

[75] Inventors: Bruno Coppi, Winchester, Mass.; Alfred Koch, Bremgarten, Switzerland; Lorenzo Lanzavecchia, Milan, Italy; Jon Rauch, Zürich, Switzerland

[73] Assignee: BBC Brown Boveri AG, Baden, Switzerland

[21] Appl. No.: 36,891

[22] Filed: Apr. 9, 1987

[30] Foreign Application Priority Data

Apr. 25, 1986 [CH] Switzerland .......................... 1707/86

[51] Int. Cl.⁴ .............................................. G21B 1/00
[52] U.S. Cl. .................................... 376/142; 335/299; 336/225
[58] Field of Search ................ 376/133, 142; 335/216, 335/299; 336/225, 226, 228, 229, DIG. 1

[56] References Cited

U.S. PATENT DOCUMENTS 3,158,794  11/1964  Swartz .......................... 336/DIG. 1
3,382,471   5/1968  Brueckmann .................. 336/229
4,430,600   2/1984  Sheffield et al. ................ 376/142

OTHER PUBLICATIONS

Hansborough et al., "Design and Fabrication of a Radially Fed Implosion Heating Coil," Seventh Symp. on Eng. Probs. of Fusion Research, Oct. 1977, pp. 830–833.
The Jet Project article as described in p. 1 of Applicants specification.
"Inner Poloidal Coils for the Nuclear Fusion Experiments Jet and TFTR", J. C. Rauch et al., 1983, pp. 341–345.
"Proceedings of the Sixth Symposium on Engineering Problems of Fusion Research", Nov. 1975, R. Allgeier, pp. 777–780.
"Nuclear Technology/Fusion", Band 4, Sep. 1983, R. J. Hooper et al., pp. 936–941.

Primary Examiner—Deborah L. Kyle
Assistant Examiner—Richard W. Wendtland
Attorney, Agent, or Firm—Oblon, Spivak, McClelland, Maier & Neustadt

[57] ABSTRACT

A magnetic coil arrangement for fusion reactors, wherein toroidal field coils and poloidal field coils are combined, the current paths of the toroidal field coils being led helically around the central axis of the fusion reactor at an angle of contact adapted to the requirements in each case. The current paths of the toroidal coils in this way generate at the same time a poloidal field. This achieves an energy saving with the same reactor parameters. Furthermore, the coil system can be supplemented with additional integrated or independent toroidal and poloidal field coils.

8 Claims, 6 Drawing Sheets

MAGNETIC COIL ARRANGEMENT FOR FUSION REACTORS

BACKGROUND OF THE INVENTION

1. Field of the Invention

This invention relates to a magnetic coil arrangement for fusion reactors, of the type, for example, described in the brochure "The JET Project", Culham Laboratory—CR 7938, undated, in particular FIG. 3.

2. Discussion of Background

Fusion reactors essentially require two different, mutually separate magnetic coil systems:

a toroidal field system for plasma confinement a poloidal coil system for the ohmic heating and stabilization of the plasma.

A conventional solution for these coil systems can be seen in FIG. 3 of the above-noted brochure, the design and mode of operation being described on pages 4 and 6 of the text.

To keep the costs of a fusion reactor low and to achieve high magnetic fields, the reactor is designed as compactly as possible. This gives rise to problems of space in the center of the reactor, in particular for the poloidal coil system, and thus, with given magnetic fields, to high current densities in the coils, with resultant energy costs.

SUMMARY OF THE INVENTION

Accordingly, one object of this invention is to provide a novel magnet arrangement of the type mentioned at the start which is distinguished by a low energy requirement and, in addition, makes a mechanically stable design possible.

This and other objects are achieved by combining the functions of the two magnetic coil systems in a central confined area of the fusion reactor, i.e. interconnecting them completely or partially. According to the invention, the current paths of the toroidal field coils are led in the form of a helix around the central axis of the reactor. The angle of wrap of the spirals is adapted in a range of 30° to 360° to the requirements in each case. The result of this is that—without additional space requirement—as well as the toroidal field, a poloidal field is also produced with a magnetomotive force close to the plasma.

The magnetic field desired can be generated exclusively in the way described above, or else in combination with additional independent or integrated toroidal and poloidal field coils. In any case, the additionally required poloidal field component is smaller by the amount generated by the helix of the toroidal field coil system.

A major advantage of the invention is in the energy saving achieved in comparison with the conventional solution, with the same parameters of the fusion reactor. If, namely, the flows of current in the toroidal field and poloidal field coils of a conventional coil system are compared with those of the system described above, the following is the result:

While the flow of current of the toroidal field coils is similar in both cases, in the solution on which this invention is based a clear reduction in the current of the poloidal field coil system is achieved, and thus a corresponding energy saving.

A further advantage arises from the partial compensation of magnetic forces between the toroidal and poloidal field coils and the associated reduction in mechanical stresses in the coil conductors and in the insulation. In addition, the high tensile forces produced in the conventional solutions in the area of the inner side of the toroidal field coils are further reduced by the helical arrangement of the conductors.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
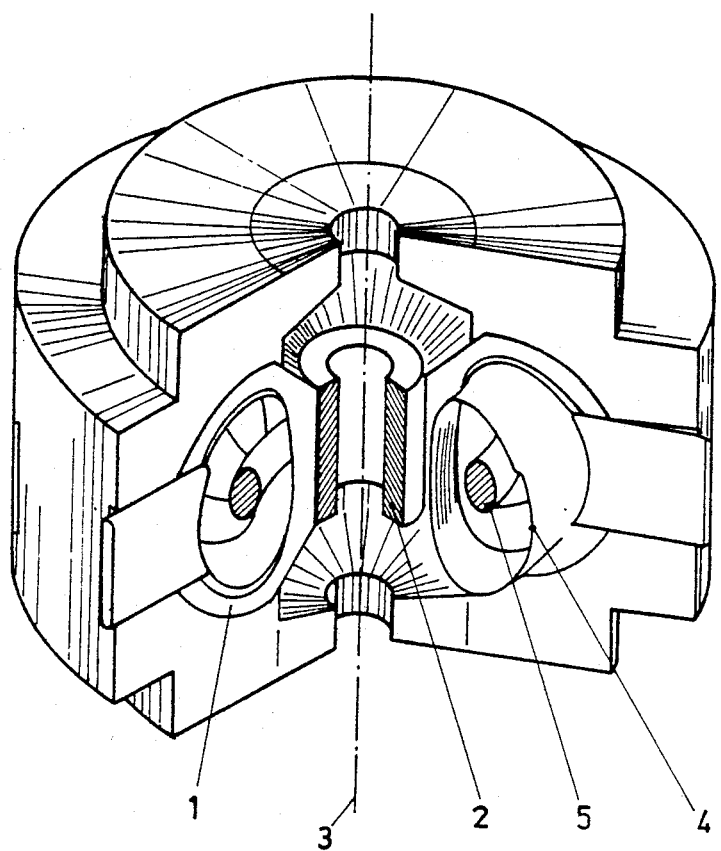
FIG. 1 is a simplified perspective view of a known magnet arrangement with physically separate toroidal and poloidal field coils.

Referring now to the drawings, wherein like reference numerals designate identical or corresponding parts throughout the several views, and more particularly to FIG. 1 thereof the know coil arrangement, consists essentially of a toroidal field system with a plurality of toroidal field coils 1 and a poloidal field system arranged coaxial to the central axis 3 of the fusion reactor and with a number of poloidal field coils 2.

The toroidal field coils 1 are evenly distributed around the periphery of a toroidal vacuum chamber 4, in which the plasma 5 is confined. FIG. 1 does not include the components of the magnetic circuit, if one is provided at all. The core, passing through the bore hole of the poloidal field coil 2 and the yokes arranged radially thereto, are nevertheless shown individually in FIG. 3 of the brochure cited and are therefore not described here any further.

Figure 2:
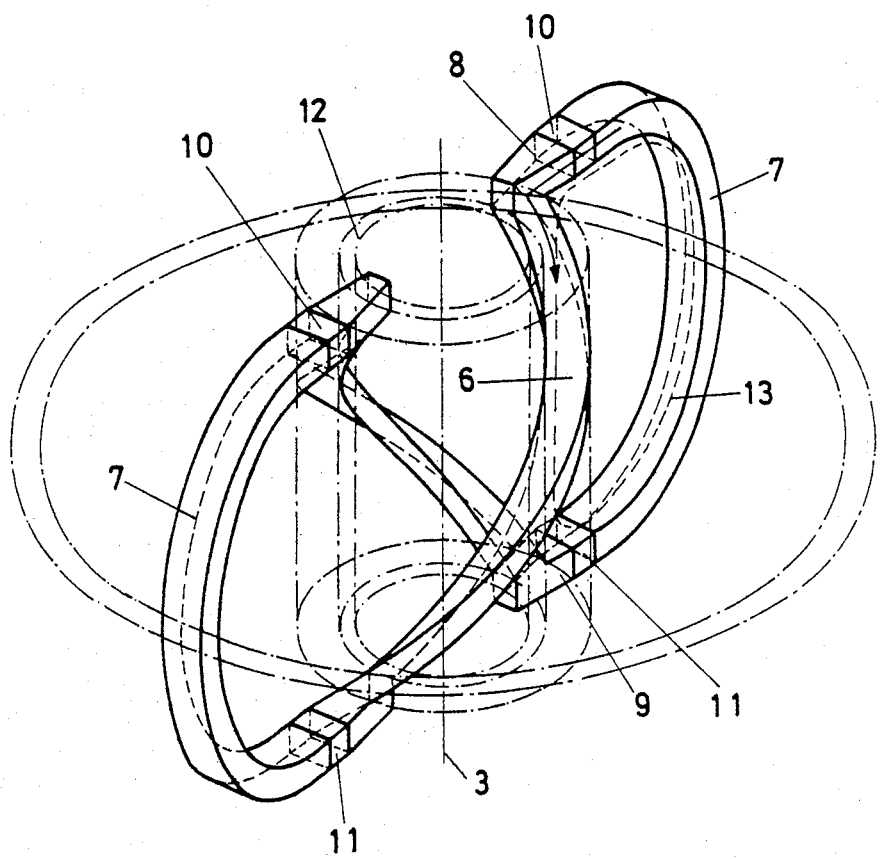
FIG. 2 is a diagrammatic perspective view of a first embodiment of the coil according to the invention with 180° angle of wrap.

In FIG. 2, a first embodiment of a coil arrangement according to the invention is shown diagrammatically. Each coil consists of a helically wound inner bow 6 and an outer bow 7. The angle of wrap of the inner bow 6 is approximately 180° in the example. The ends of the inner bow 6 are bent off radially outward; these radial extensions are denoted by 8 and 9. The inner and outer bows are interconnected by means of connecting pieces 10, 11. In the example, they are disposed radially outward, where force and space conditions allow a conventional connection technique, e.g. soldering, welding, bolting etc. The electrical connections not shown in FIG. 2 are made analogously to the known design on the outer periphery of the outer bow 7.

Figure 3:
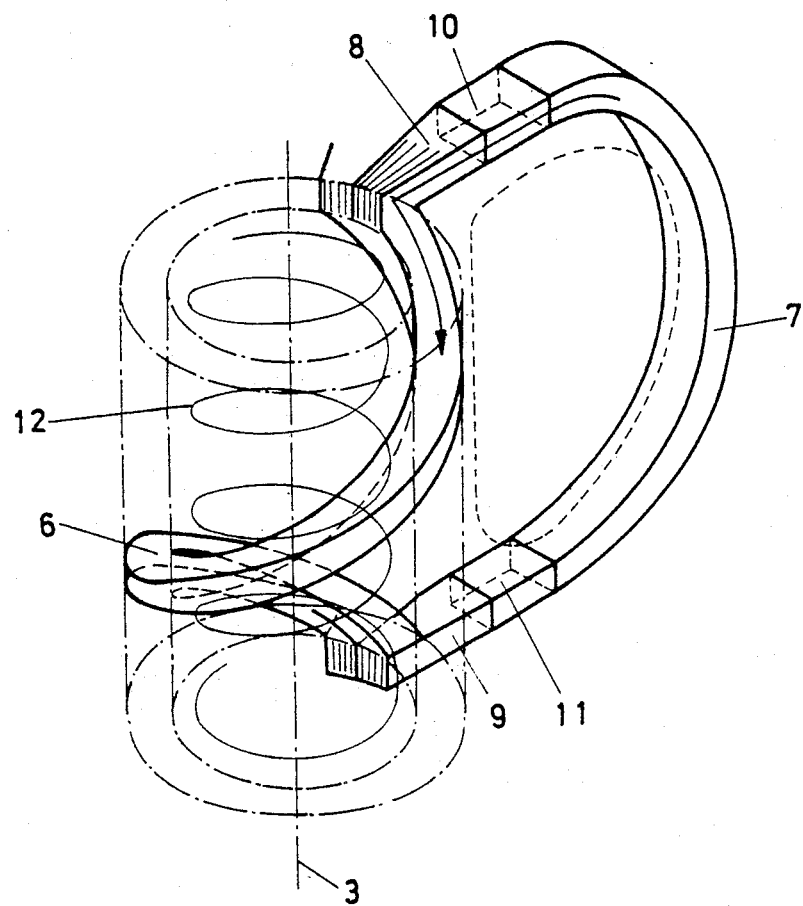
FIG. 3 is a diagrammatic perspective view of a second embodiment with 360° angle of wrap.

In FIG. 3, a coil arrangement is shown in which the angle of contact of the inner bow 6 is 360°. Otherwise, its design corresponds to that of the coil arrangement according to FIG. 2.

As a comparison with FIG. 1 shows, coils of such design can be fitted into the known arrangement without any appreciable modifications to the reactor.

Figure 5:
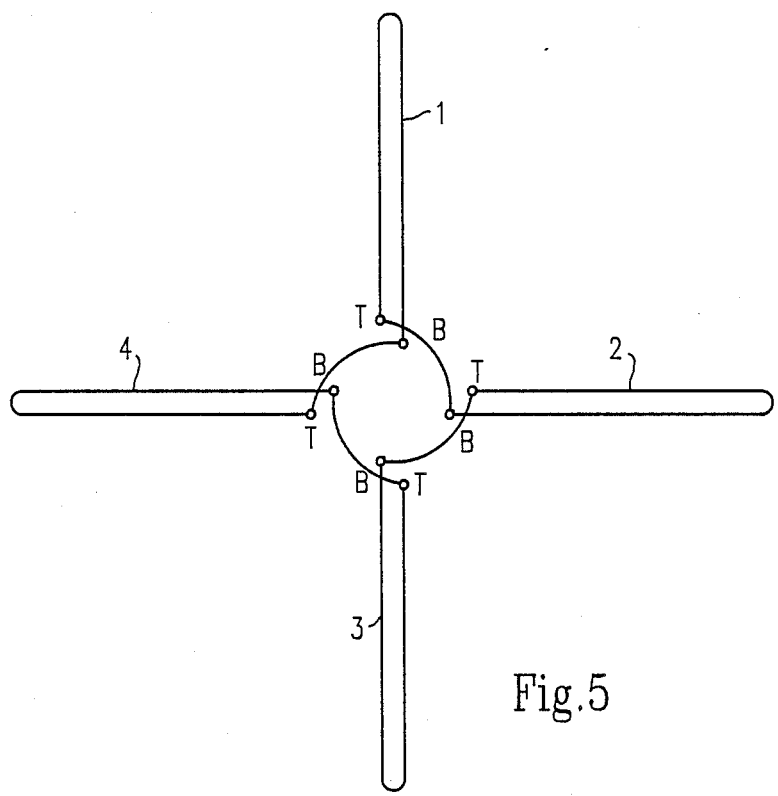
FIGS. 5 and 6 are schematic diagrams illustrating alternative embodiments of the invention in which inner bows have an angle of wrap of 90° and 30°, respectively.
Figure 6:
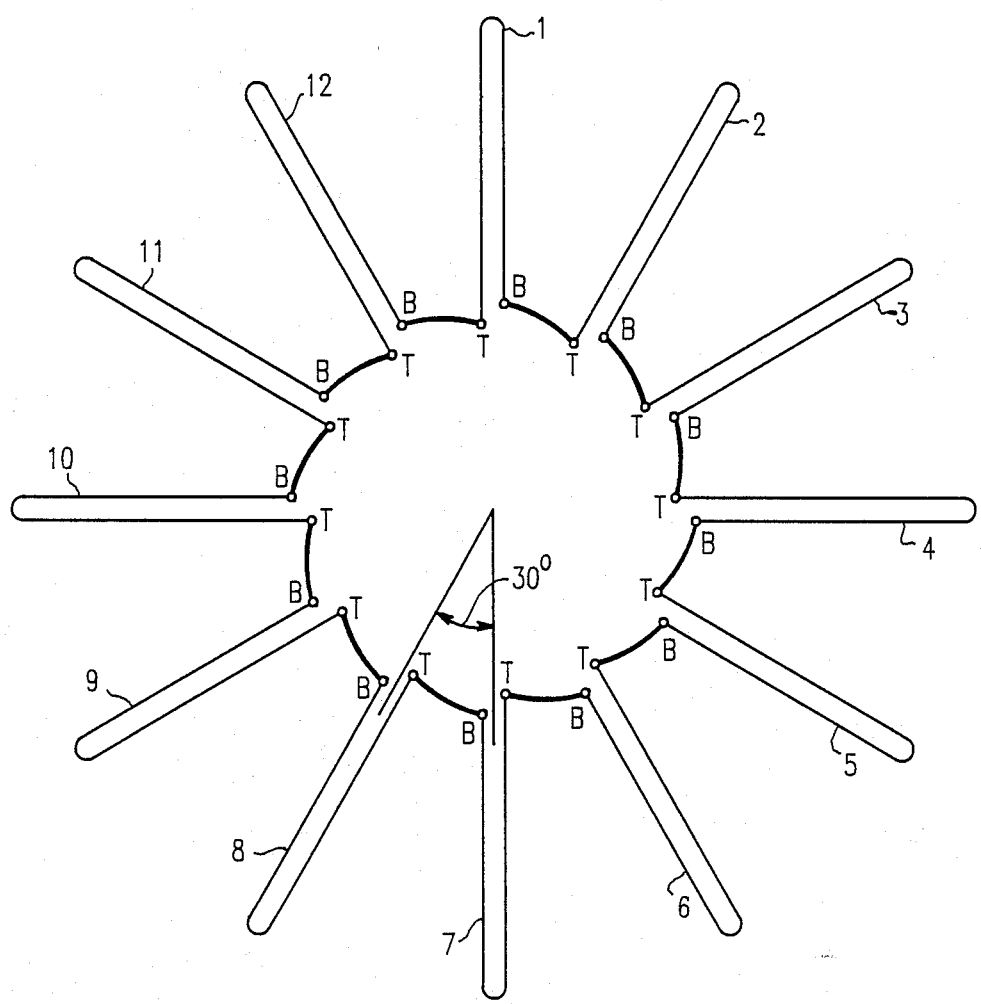

The coil arrangements according to FIGS. 2 and 3 can be supplemented if need be by additional poloidal field coils. These may lie both in the interior of the cylinder coil formed by the inner bows 6 and at its outer diameter. The first alternative is shown diagrammatically and in broken lines in FIGS. 2 and 3; the additional poloidal field coil is denoted there by 12. Likewise, additional toroidal field coils 13 may be arranged in the coil arrangement in the annular space bounded by the outer bows 7 and inner bow, as is indicated for example in FIGS. 2 and 3. Alternatively, as shown in FIGS. 5 and 6, the angle of wrap of the inner bow can be made smaller, for example, 90° (FIG. 5) or 30° (FIG. 6), an additional bows being provided so that the total angle of wrap of all the inner bows is at least 360°.

Figures 4A, 4B:
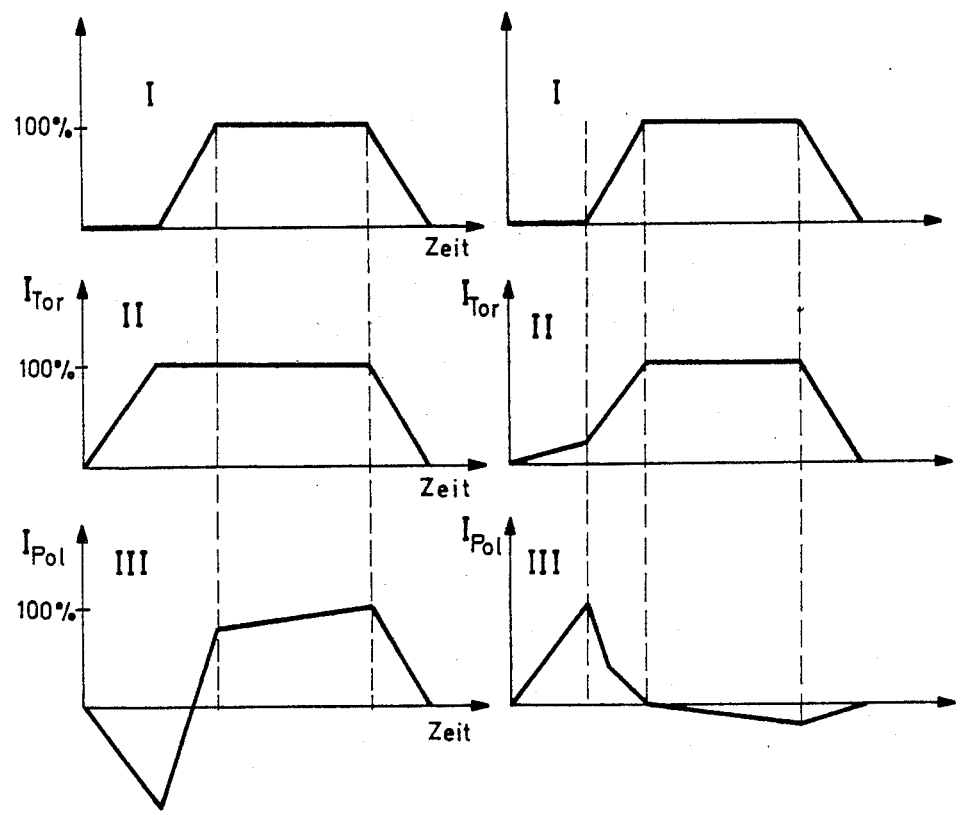
FIGS. 4a and 4b are timing diagrams in which the flows of current in the coil arrangement according to the invention are compared with those in the known coils.

A major advantage of the invention is the energy saving which is achieved in comparison with the conventional solution, with the same parameters of the fusion reactor. In FIG. 4a the flows of current in the toroidal field and poloidal field coils of a conventional coil system are compared with those of the system described above as shown in FIG. 4b, the Diagram I showing the flow of current $I_p$ in the plasma over time, Diagram II showing the flow of current $I^T_{or}$ in the toroidal field coils over time and Diagram III showing the flow of current $I^P_{ol}$ in the poloidal field coils over time.

While the flow of current of the toroidal field coils is similar in both cases, in the solution shown in FIG. 4b on which this invention is based, a clear reduction in the current of the poloidal field coil system is achieved, and thus a corresponding energy saving.

A further advantage arises from the partial compensation of magnetic forces between the toroidal and poloidal field coils and the associated reduction in the mechanical stresses in the coil conductors and in the insulation. In addition, the high tensile forces occuring in conventional solutions in the area of the inner side of the toroidal field coils are further reduced by the helical arrangement of the conductors.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A fusion reactor comprising:
   a toroidal vacuum chamber containing a plasma; and
   a magnetic coil arrangement for generating a toroidal field system and a poloidal field system which act on said plasma, comprising a coil for generating both said toroidal and poloidal field systems, said coil comprising at least one outer bow encompassing said vacuum chamber and at least one inner bow electrically and mechanically interconnected to said outer bow and wrapped in the form of a helix around a central axis of the reactor.

2. The reactor according to claim 1, further comprising:
   a poloidal field coil arranged in the interior of the magnetic coil arrangement.

3. The reactor according to claim 1, further comprising:
   a poloidal field coil surrounding said at least one inner bow.

4. The reactor according to claims 1, 2 or 3, wherein said coil comprises pairs of inner and outer bows, further comprising:
   toroidal field coils provided in an annular space bounded by the inner bows and outer bows.

5. The reactor according to claims 1, 2 or 3, wherein said at least one inner bow defines an angle of wrap between 30° and 360°.

6. The reactor according to claim 4, wherein said inner bows define an angle of wrap between 30° and 360°.

7. The reactor according to claim 5, wherein said angle of wrap is around 180°.

8. The reactor according to claim 6, wherein said angle of wrap is around 180°.

* * * * *